United States Patent
Hogan

[11] 3,749,460
[45] July 31, 1973

[54] TWO-PIECE PRESSED METAL BEARING RACE WITH MEANS FOR RESILIENT MOUNTING

[75] Inventor: Martin J. Hogan, Sandusky, Ohio

[73] Assignee: General Motors Corporation, Detroit, Mich.

[22] Filed: May 4, 1972

[21] Appl. No.: 250,122

[52] U.S. Cl. .............................................. 308/196
[51] Int. Cl. .......................................... F16c 33/60
[58] Field of Search ................... 308/194, 184, 196, 308/195

[56] References Cited
UNITED STATES PATENTS
2,193,549  3/1940  Chamberlan .................... 308/184 R

*Primary Examiner*—Charles J. Myhre
*Assistant Examiner*—Frank Susko
*Attorney*—J. L. Carpenter and F. J. Fodale

[57] ABSTRACT

A bearing race comprises two identical pressed metal pieces. Each piece includes an annulus with a curved raceway on its inside surface and stepped segments continuous with the annulus. In assembly, the segments of each piece cross over the segments of the other piece and have portions which overlie the annulus of the other piece. The overlying portions resiliently mount the two piece bearing race on a support and allow radial movement of each annulus with respect to the support.

10 Claims, 5 Drawing Figures

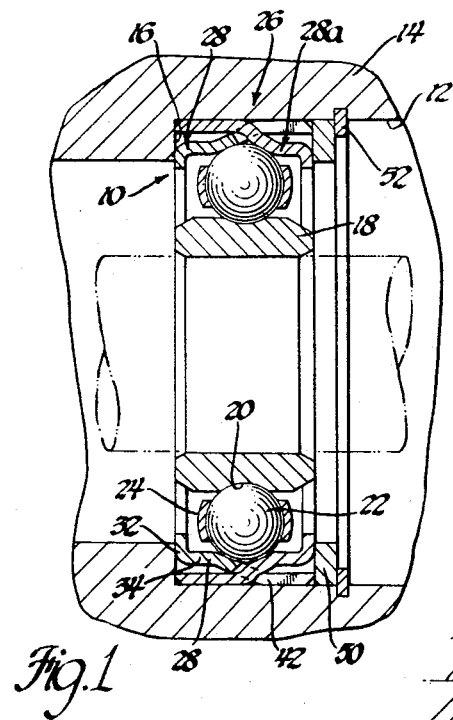
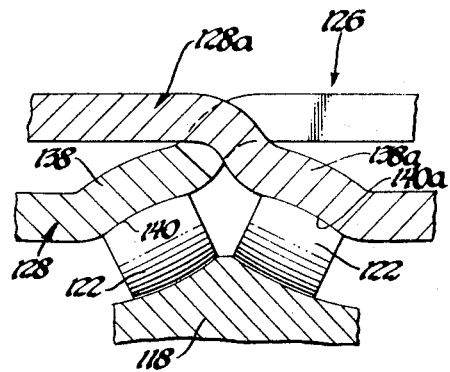
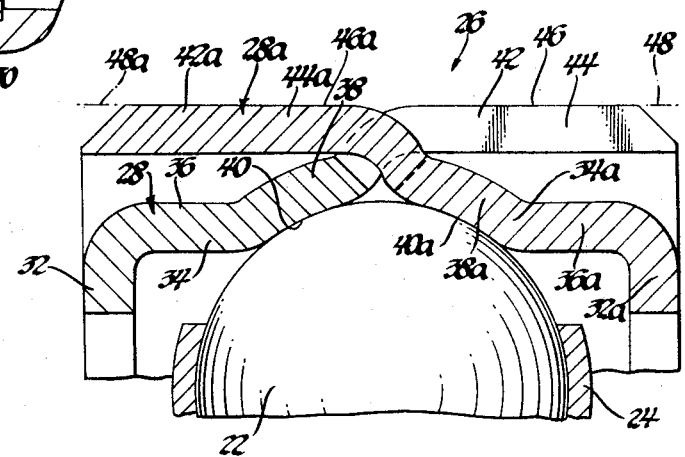
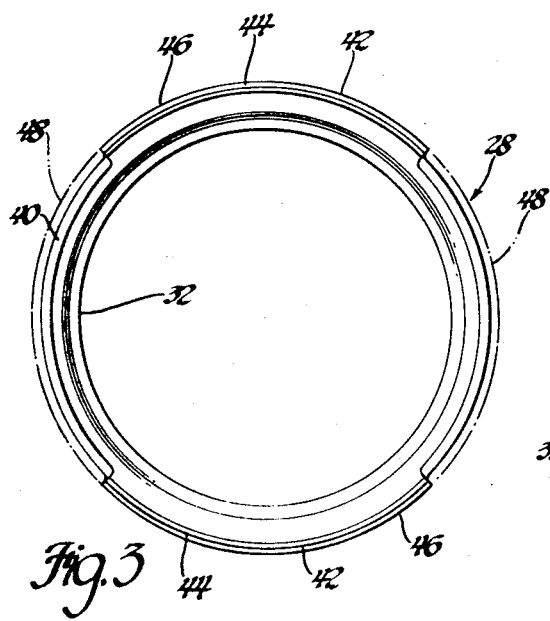
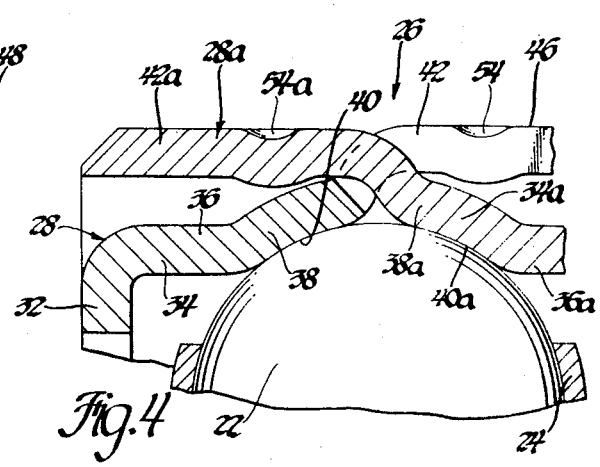

TWO-PIECE PRESSED METAL BEARING RACE WITH MEANS FOR RESILIENT MOUNTING

My invention relates generally to antifriction bearings and more specifically to a race which incorporates means for resiliently mounting an antifriction bearing which includes the race as a part thereof.

The object of my invention is to provide a simple, economical bearing race of compact design which incorporates means for resiliently mounting an antifriction bearing when the race is used in combination with other conventional components of an antifriction bearing.

I have generally accomplished the object of my invention with a two-piece pressed metal bearing race which in its preferred form has the following features.

Both pieces of the two-piece construction are identical thereby minimizing tooling and inventory costs as well as eliminating any confusion in assembling two pieces when the two pieces are dissimilar.

A resilient support is integrally incorporated into the two-piece race eliminating the need for separate resilient spacers, rubber rings, tolerance rings or spring devices as used in prior resiliently mounted bearings.

Each piece of the bearing race incorporates the resilient support in a minimum annular space providing a compact design.

Each piece is designed without any reverse or severe bends thereby facilitating pressing of the pieces from sheet metal stock such as by drawing, cupping or stamping.

The separate pieces incorporate means to retain the pieces in assembly during handling.

The separate pieces incorporate means to precisely locate the pieces axially with respect to each other when the bearing race is mounted on a support.

These and other features of the invention will become more readily apparent as reference is made to the following detailed description of a preferred embodiment in connection with the annexed drawings wherein:

FIG. 1 is an elevation in section showing a ball bearing having an outer race in accordance with my invention mounted in the counterbore of a support.

FIG. 2 is an enlargement of a portion of FIG. 1.

FIG. 3 is a front view of one of the race pieces shown in FIG. 2.

FIG. 4 is a view similar to FIG. 2 showing the race pieces with retaining means for unit handling.

FIG. 5 is an elevation partially in section showing the upper half of a double row barrel bearing having an outer race in accordance with my invention.

Referring now to the drawings and more specifically to FIG. 1, a ball bearing 10 is resiliently mounted in the counterbore 12 of a support 14 against a shoulder 16 formed by the counterbore 12.

The bearing 10 includes a conventional hardened and ground inner race 18 with a deep groove ball track 20 and a complement of balls 22 which are circumferentially spaced by a cage 24.

The outer race 26 comprises two identical pieces 28 and 28a of substantially uniform thickness pressed from sheet metal stock. The piece 28 is generally cup-shaped having an inturned flange 32 at one end which connects with annulus 34 having a short cylindrical portion 36 and a curved portion 38. See FIGS. 2 and 3. The inside surface of the curved portion 38 provides a concave raceway 40 for the balls 22.

Continuous with the curved portion 38 are two equally circumferentially spaced segments 42. The segments 42 have axially disposed portions 44 for a majority of their length. In cross section the segments are arcuate and each constitute approximately 90 arc degrees of a right cylinder leaving a like amount of space between them. The portions 44 are spaced radially outward of the curved portion 38 of the annulus 34 and their outer surfaces 46 lie in an imaginary cylindrical surface 48.

The race piece 28a is identical to the race piece 28 and corresponding parts have been identified by adding "a" to the identifying numerals for the race piece 28. The relationship of the pieces 28 and 28a forming the race 26 is evident from FIGS. 1, 2 and 3. The pieces 28 and 28a confront each other with the segments of one interposed between the segments of the other. The axial portions on the segments of one piece overlie the annulus of the other piece and vice-versa. For instance, the segments 42a of piece 28a are interposed between the segments 42 of piece 28 in the space between the segments 42 and cross over with the portions 42a overlying the annulus 34 of the piece 28.

The pieces 28 and 28a being identical both have outer surfaces 46 and 46a lying in congruent imaginary cylindrical surfaces 48 and 48a and are thus adapted to intimately engage a common cylindrical surface of substantially equal diameter. The pieces are illustrated in FIG. 2 as though they were engaging such a surface and it is important to note that space is provided between the annulus 34 and the segments 28a and between the annulus 34a and the segments 28 at the cross over areas so that the annuli 34 and 34a are capable of radial movement when the pieces are mounted in the counterbore of a stiff support such as is shown in FIG. 1.

The pieces 28 and 28a are designed so that at their proper relative axial positions the ends thereof are aligned and thus each of the pieces 28 and 28a have one end engaging the shoulder 16. As shown in FIG. 1, a keeper plate 50 may be used to abut the opposite ends of the pieces to assure the proper alignment of the pieces 28 and 28a within the counterbore 12. The keeper plate 50 is held against the pieces 28 and 28a by a snap ring 52 mounted in a groove in the counterbore 12.

The counterbore 12 provides a solid support for the axial portions 44 and 44a by reason of intimate contact therewith over the substantial area provided by the surfaces 46 and 46a. From this solid support, the raceways 40 and 40a are capable of radial movement by virtue of the spaces provided at the cross over areas of the pieces and the elasticity of the pieces which resiliently deflect primarily at the cross over areas of the segments where there is a transition from an annulus to a plurality of circumferentially spaced portions.

It is also to be noted that the cross over support design minimizes the annular space requirements and allows pieces which have no reverse or deep bends.

While two equally circumferentially spaced segments have been illustrated for the purpose of disclosure, it is understood that a greater number of segments may be used so long as the segments of one piece can be interposed between those of the other piece whether they be symmetrical or not. While it is preferable to have the race pieces identical, such a feature is not critical and my invention encompasses those designs wherein the two pieces are distinct.

Referring now to FIG. 4, there is shown a ball bearing race in accordance with my invention slightly modified to incorporate a retaining feature for the race pieces. In this modification, each of the segments 42 and 42a include a dimple 54 and 54a respectively to provide retention surfaces. The retention surfaces provide a diameter which is a few thousandths less than the maximum diameter of the annulus of the pieces so that the annulus of each piece may be snapped past the retention surfaces on the other piece and retained in assembly therewith during handling.

FIG. 5 illustrates a further modification in which the resilient two-piece outer race 126 comprises similar pieces 128 and 128a. The race 126 however is combined with two rows of barrel rollers 122 riding in separate tracks on the inner race 118. The piece 128 has a curved annulus 138 which provides a concave raceway 140 for one row of rollers while the piece 128a has a curved annulus 138a which provides a concave raceway 140a for the other row of rollers. The pieces 128 and 128a have continuous interposed segments which adapt the race for mounting on a cylindrical surface to provide a resilient race as described in detail in connection with FIGS. 1, 2 and 3.

While all embodiments illustrated show an outer race in accordance with my invention, it is understood that the principles of my invention are applicable to an inner race in which case the segments on each piece would be inside of the annulus and would be mounted on a shouldered shaft or the like.

I wish it to be understood that I do not desire to be limited to the exact details of construction shown and described, for obvious modifications will occur to a person skilled in the art.

I claim:

1. A resilient radial antifriction bearing race comprising
   a first pressed metal piece of substantially uniform thickness having a first annulus with a first concave raceway thereon,
   a plurality of first segments continuous with said first annulus, said first segments having substantial axially disposed first portions spaced radially from said first annulus in a direction from said first raceway through said first annulus,
   said first portions having first surfaces on the side thereof remote from said first raceway lying in a first imaginary cylindrical surface,
   a second pressed metal piece of substantially uniform thickness having a second annulus with a second concave raceway thereon,
   a plurality of second segments continuous with said second annulus, said second segments having substantial axially disposed second portions spaced from said second annulus in a direction from said second raceway through said second annulus,
   said second portions having second surfaces on the side thereof remote from said second raceway lying in a second imaginary cylindrical surface congruent with said first imaginary cylindrical surface, and
   said first and second segments being interposed and overlying said second annulus and first annulus respectively with sufficient spacing therebetween to permit limited movement of said first annulus and said second annulus in the radial direction when said first and second surfaces are in intimate contact with a cylindrical surface corresponding substantially to said first and second imaginary cylindrical surfaces.

2. The bearing race as defined in claim 1 wherein said first and second portions are arcuate in cross section and extend for a majority of the length of said first and second segments respectively.

3. The bearing race as defined in claim 1 wherein said first and second segments have retention surfaces operatively associated with the annulus it overlies to prevent separation of the pieces during handling.

4. The bearing race as defined in claim 1 wherein said first and second pieces are identical and said first and second segments are equally circumferentially spaced.

5. The bearing race as defined in claim 1 wherein said first and second pieces are axially coextensive and each have a flange at the end thereof remote from their respective segments.

6. The bearing race as defined in claim 1 wherein said race constitutes a split ball bearing race and said first and second raceways form a track for a single complement of balls.

7. The combination comprising
   a support having a radial shoulder and a contiguous cylindrical surface,
   a resilient radial antifriction bearing race mounted on said support, said race comprising
   a first pressed metal piece of substantially uniform thickness having a first annulus with a first concave raceway thereon,
   a plurality of first segments continuous with said first annulus abutting said shoulder, said first segments having substantial axially disposed first portions extending for a majority of their length spaced radially from said first annulus in a direction from said first raceway through said first annulus,
   said first portions having first surfaces on the side thereof remote from said first raceway in intimate contact with said cylindrical surface,
   a second pressed metal piece of substantially uniform thickness having a second annulus with a second concave raceway thereon abutting said shoulder,
   a plurality of second segments continuous with said second annulus, said second segments having substantial axially disposed second portions extending for a majority of their length spaced from said second annulus in a direction from said second raceway through said second annulus,
   said second portions having second surfaces on the side thereof remote from said second raceway in intimate contact with said cylindrical surface,
   said first and second segments being interposed and overlying said second annulus and first annulus respectively with sufficient spacing therebetween to permit limited movement of said first annulus and said second annulus in the radial direction with respect to said support, and
   antifriction means rollably engaging said raceways.

8. The combination as defined in claim 7 wherein said first and second pieces are identical, said first and second segments are equally circumferentially spaced and said first and second portions respectively thereof cumulatively total substantially 360 arc degrees.

9. The combination as defined in claim 8 wherein said first and second pieces each have first and second flanges respectively at the end thereof remote from their respective segments wherein said second flange abuts said shoulder and further including radially extending means mounted on said support engaging said second segments and said first flange.

10. The combination as defined in claim 9 wherein said race constitutes a split ball bearing race and said first and second raceways for a single track and wherein said antifriction means is a single complement of balls.

* * * * *